United States Patent
Schaffer et al.

[19]

[11] Patent Number: 5,933,563
[45] Date of Patent: Aug. 3, 1999

[54] CABLE ENCLOSURE WITH PASS THROUGH

[75] Inventors: Ronald Richard Schaffer; John Carey Hoffer, both of Harrisburg, Pa.

[73] Assignee: The Whitaker Corporation, Wilmington, Del.

[21] Appl. No.: 08/950,183

[22] Filed: Oct. 14, 1997

[51] Int. Cl.⁶ .................................................. G02B 6/00
[52] U.S. Cl. .............................. 385/135; 174/58; 174/60; 220/3.7; 312/223.6
[58] Field of Search .................................. 174/50, 58, 60, 174/64, 65 R, 65 SS, 17.05, 50.51, 50.55; 220/3.92, 3.94, 3.7; 312/223.6, 296, 223.1, 265.1; 385/135, 137

[56] References Cited

U.S. PATENT DOCUMENTS

| | | | |
|---|---|---|---|
| 3,753,047 | 8/1973 | Shallbetter | 361/672 |
| 3,917,101 | 11/1975 | Ware | 220/3.2 |
| 4,263,472 | 4/1981 | Maheu | 174/51 |
| 5,109,467 | 4/1992 | Hogan et al. | 385/135 |
| 5,272,279 | 12/1993 | Filshie | 174/50 |
| 5,323,480 | 6/1994 | Mullaney et al. | 385/135 |
| 5,535,298 | 7/1996 | Fasnacht et al. | 385/135 |
| 5,546,495 | 8/1996 | Bruckner et al. | 385/135 |
| 5,831,213 | 11/1998 | Wright et al. | 174/64 |

*Primary Examiner*—Kristine Kincaid
*Assistant Examiner*—Dhiru R Patel
*Attorney, Agent, or Firm*—June B. Schuette

[57] ABSTRACT

The present invention provides a sealed enclosure which houses fiber optic cable in a manner accepted in the field. The sealed enclosure for a cable includes a floor surface, the floor surface having a discontinuous periphery defining at least one opening in the floor surface, the at least one opening defining a pass through in the floor surface. Upstanding side and back walls extend from the floor surface, and a ceiling surface joins with the side and back walls opposite to the floor surface. At least one door is mounted to a front of the enclosure and against corresponding edges of the floor surface, side walls, and ceiling surface. A sealing assembly is positioned over the at least one opening in the floor surface to seal the enclosure from the external environment upon insertion of the cable within the enclosure.

42 Claims, 5 Drawing Sheets

CABLE ENCLOSURE WITH PASS THROUGH

FIELD OF THE INVENTION

The present invention relates to the field of cable enclosures having a cable entrance and exit. More particularly, the present invention relates to a cable enclosure having a sealing assembly for sealing the cable entrance and exit of the enclosure against the weather or environment external to the interior of the enclosure.

BACKGROUND OF THE INVENTION

In the environment of enclosures, it is known to store fiber optic cables in an enclosure. The use of fiber optic cables in the field require a secure enclosure, safe from external effects such as weather, insects and intruders. In addition, a cable, once introduced into the enclosure, must be spliced. A suitable enclosure would be a NEMA 3 rated enclosure and would meet the needs identified above. However, there are no known NEMA 3 rated enclosures available for fiber optic cables. The NEMA 3 rated enclosures contain splice trays at the entrance and exit points of the enclosure, which must be patched in order to secure the interior of the enclosure. When using splice trays, it is necessary to completely cut a cable, thereby reducing the integrity of the cable. A problem, therefore, exists in the art of cable enclosures whereby there is no known enclosure which provides a sealable pass through which permits looping of fiber optic cable into the enclosure without severing all conductors of the cable. The outside jacket can be removed inside the enclosure and tied off at the entrance and exit points.

SUMMARY OF AN EMBODIMENT OF THE INVENTION

It is an object of an embodiment of the invention to provide an easily accessible cable entrance and exit for a fiber optic cable enclosure.

It is another object of an embodiment of the invention to provide a cable entrance and exit to an enclosure through which cable is insertable intact.

It is another object of an embodiment of the invention to provide a seal for cable entrance and exits of an enclosure thereby sealing the enclosure from an external environment.

These and other objects of the present invention are achieved by providing a sealed enclosure which houses fiber optic cable in a manner accepted in the field.

In particular, the sealed enclosure for a cable includes a floor surface, the floor surface having a discontinuous periphery defining at least one opening in the floor surface, the at least-one opening defining a pass through in the floor surface. Upstanding side and back walls extend from the floor surface, and a ceiling surface joins with the side and back walls opposite to the floor surface. At least one door is mounted to a front of the enclosure and against corresponding edges of the floor surface, side walls, and ceiling surface. A sealing assembly is positioned over the at least one opening in the floor surface to seal the enclosure from the external environment upon insertion of the cable within the enclosure.

Advantages of an embodiment of the invention as described more fully hereinbelow include a weatherproof, insect proof and tamper proof enclosure for fiber optic cable. In addition, cable is insertable into the enclosure without a necessity for splicing the cable. The jacket is removed inside the enclosure and tied off at entrance and exit points therein, thereby maintaining the integrity of the cable. The entrance and exit points are sealed subsequent to insertion of the cable and the enclosure is weather resistent.

BRIEF DESCRIPTION OF THE DRAWINGS

The present invention will become more fully understood from the detailed description given by way of illustration only, and thus are not limitative of an embodiment of the invention, and wherein.

DETAILED DESCRIPTION OF THE INVENTION

While the present invention may have many applications, an exemplary application and related description follows. Specifically, a purpose of an embodiment of the present invention is to provide a cable enclosure that receives a cable therein and which permits splicing of only a subset of the conductors of the cable without requiring that all conductors of the cable be spliced. In addition, the enclosure is weather proof and suitable for housing at least fiber optic cables. To that end, the following is a detailed description of an embodiment according to the teachings of the present invention.

Figure 1:
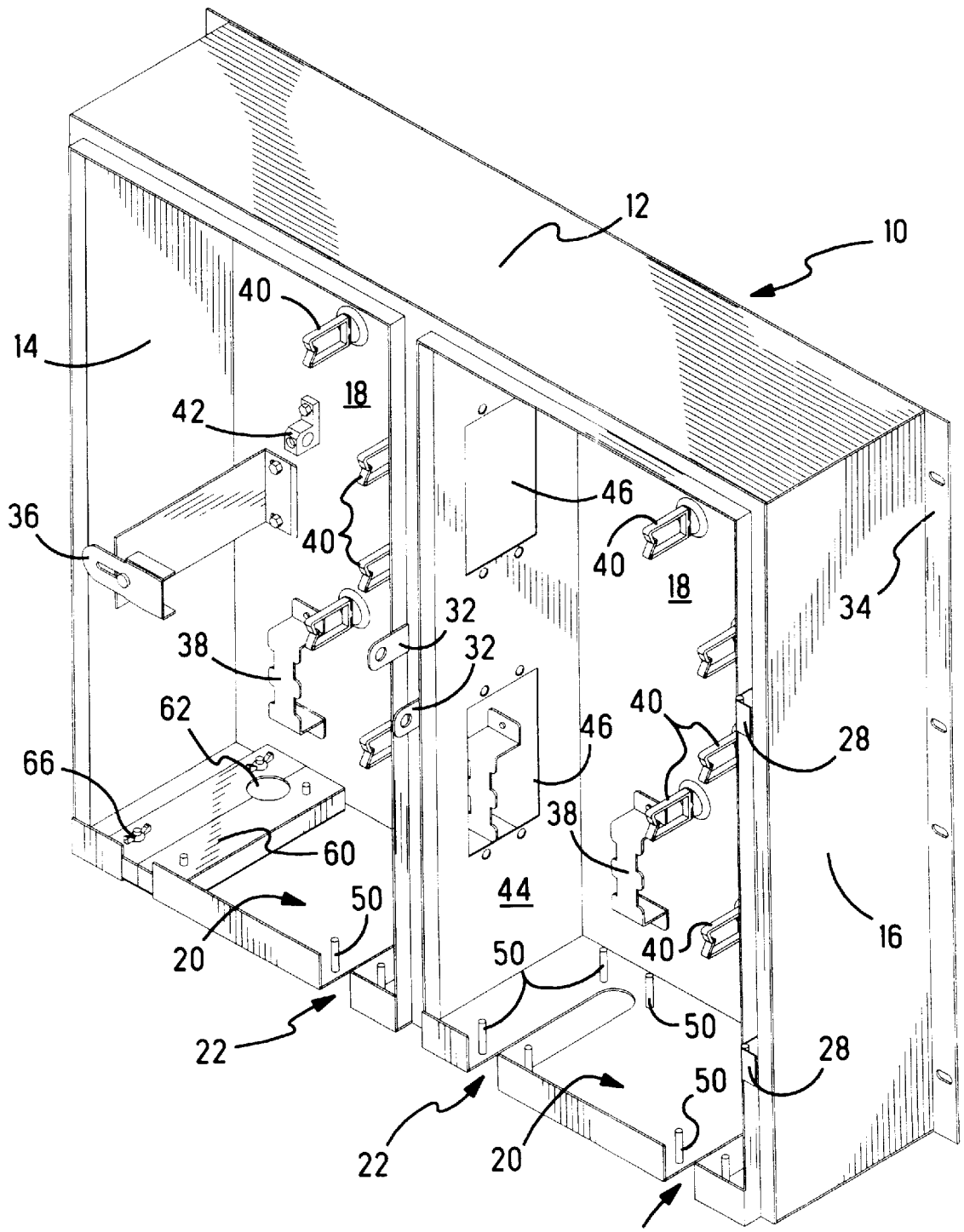
FIG. 1 is a perspective interior view of a enclosure without a cable shown.

Referring first to FIG. 1, there is illustrated a perspective interior view of a enclosure 10 without internal cables being shown therein and with only a single seal assembly shown. The purpose of this figure is primarily to illustrate the construction of the enclosure 10 and the portions thereof which are sealed against the elements for its ultimate use. More specifically, the enclosure 10 includes a top or ceiling portion 12, opposite side walls 14, 16, a back wall 18, and a floor portion 20 opposite the ceiling portion 12. The floor 20 is the base or primary support to the enclosure 10. The side walls 14, 16 and the back wall 18 are mounted on the floor 20 at the outer perimeter thereof in an upstanding manner to define the perimeter of the enclosure 10.

Figure 3:
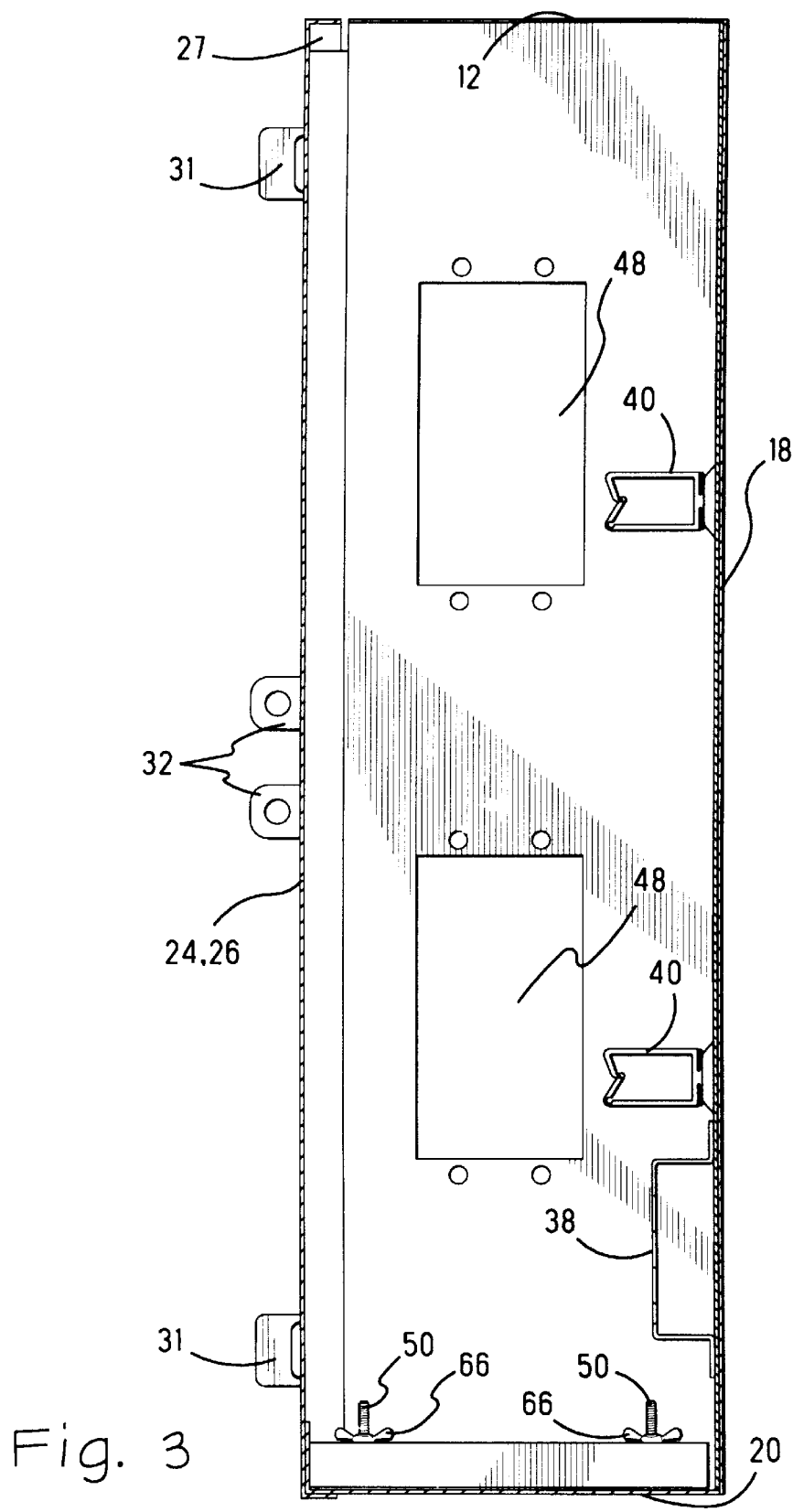
FIG. 3 is an exposed side view of a closed cabinet, partially in section.
Figure 4:
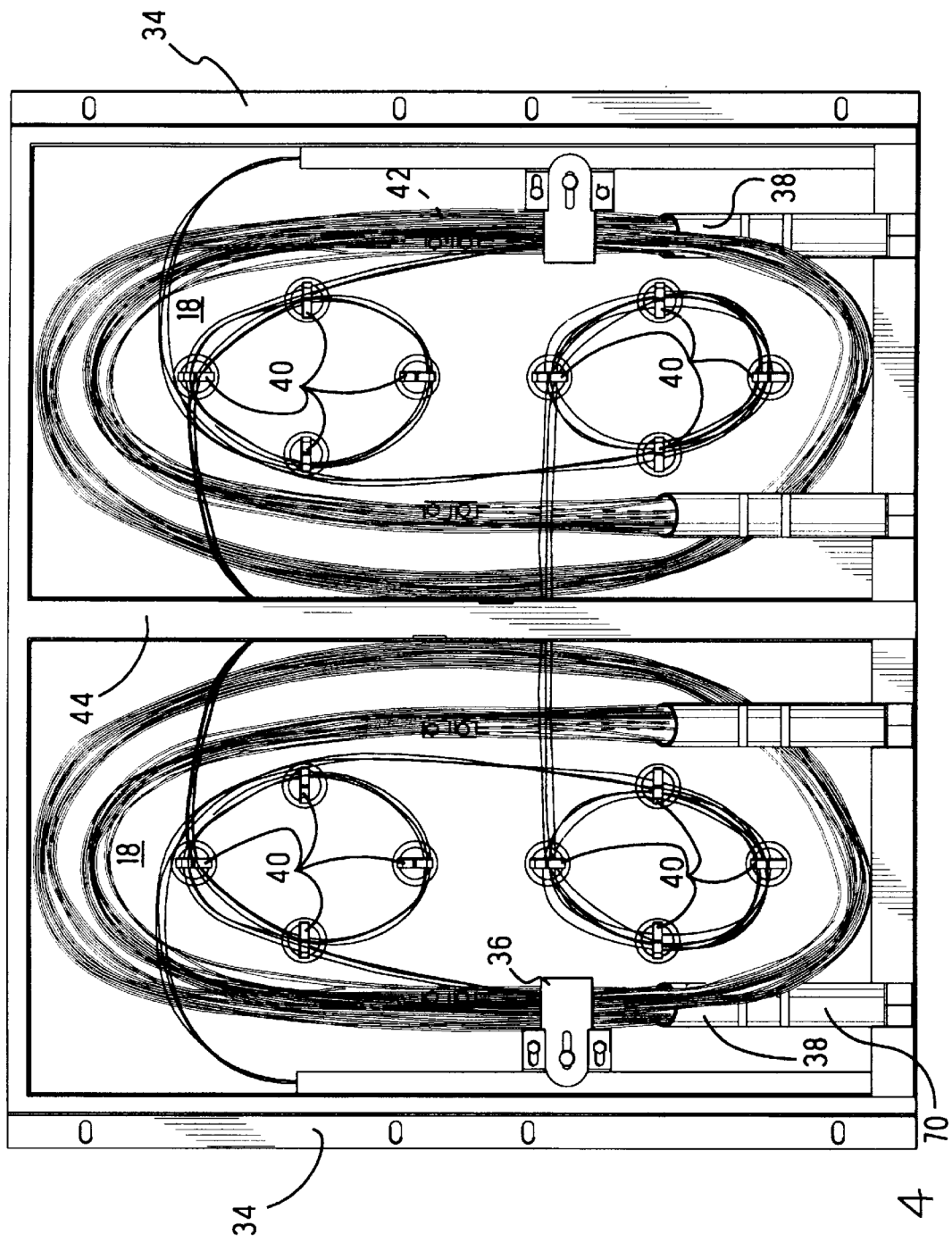
FIG. 4 is a front plan interior view, including cable entry, cable management, and seal assembly.

The enclosure 10 also includes a thin center or dividing wall 44 positioned substantially intermediate of the side walls 14, 16 of the enclosure 10. As shown in this and later views, the dividing wall 44 has at least two cutout openings 46 therein. The cutout openings 46 provide access between divided sides of the enclosure and are intended to support splicing holders such as a six pack holder 48 or the like in each opening 46. The resulting assembly is shown in FIGS. 2, 3, and 4 and will be described further in connection with those figures.

Although the defining sides and walls of the enclosure 10 have been described as back, sides, and the like, these components are only intended to assist in the description of the preferred embodiment. Accordingly, the inventive description is not intended to limit the relative orientation, size, or shape of the enclosing parts of the enclosure 10 with respect to each other. In other words, it is conceivable that the enclosure may be in a reclined, horizontal, or sideways orientation, thus altering the relative description herein. Likewise, the shape of the enclosure 10 as rectangular is not intended to be limiting and any useful shape may be utilized.

Figure 2:
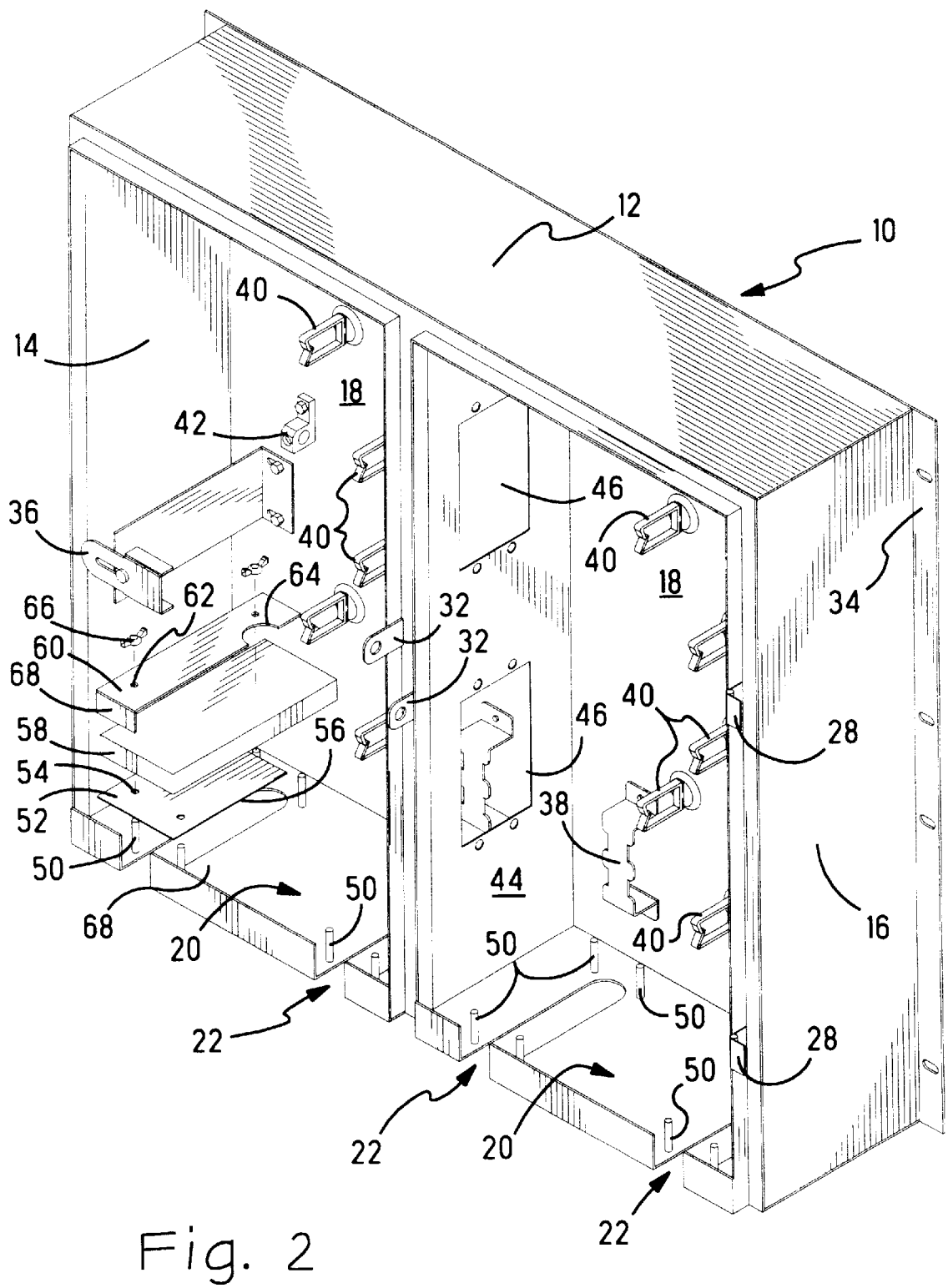
FIG. 2 is a perspective view of the enclosure shown in FIG. 1 with an exploded seal assembly over a pass through of the enclosure floor.

As shown in FIGS. 1 and 2, the floor portion 20 includes slots 22 formed therein. In the embodiment shown, there are two slots 22 formed in each side of the enclosure 10, a "side" being understood as to one or the other side of the dividing wall 44. Each slot 22 extends in the floor 20 and from a front face of the enclosure 10 to a point adjacent the back wall 18 of the enclosure 10. The slots 22 are shown to be substantially U-shaped and spaced apart to avoid electrical or other interference with an adjacent slot 22.

On an inner face of the back wall 18 of the enclosure 10, certain parts are included to assist in the looping and securing of cable 70 within the enclosure 10. In particular, there are shown plural mounting pegs 40 protruding from the inner face of the back wall 18. The pegs 40 are positioned so as to receive optical fibers wrapped therearound depending upon the use of the cable within the enclosure 10. The number and position of the pegs 40 are for illustration purposes only and as such are not intended to limit the number and placement of pegs 40 in other embodiments or applications. Each of the pegs 40 is formed of plastic material in order to avoid shock to a user or interference with the optical fiber wrapped around a particular peg 40. The pegs 40 may include an additional mounting member (not shown) between the peg and the wall to assist in securing the peg 40 to the wall 18.

In addition, the inner face of the back wall 18 of the enclosure 10 includes at least one ground lug 42 for each side of the enclosure 10. The ground lug 42 is positioned in the region of cable management brackets 38. Each of the cable management brackets 38 are mounted to an inner face of the back wall 18 of the enclosure 10 and in vertical alignment with a respective one of the plural slots 22 as best shown in FIG. 3.

A splice tray bracket 36 is mounted on each side wall 14, 16 of the enclosure 10 and above the cable management brackets 38. The splice tray bracket 36 is provided to fusion splice pigtails to a center section of the enclosure if necessary (not shown). There is usually one splice tray bracket 36 for each of the divided sides of the enclosure 10.

The various components for mounting cable 70 are illustrated in order to enable one of ordinary skill in the art to make and use the disclosed cabinet 10. Due, however, to the multiple coiling and direction of fiber optic strands which are possible for a cable 70 or conductor subsets of the cable within the enclosure 10, the cable per se has been eliminated from the interior views with the exception of FIG. 4. In FIG. 4, the illustrated cable management is an example only and is not intended to limit the scope of an embodiment of the invention. In use, the cable 70 in slid into the enclosure intact. A jacket of the cable is removed interior to the enclosure and tied off at the entrance and exit points of the enclosure 10. At an interior of the cabinet 10, the cable 70 is separated for use as necessary. In particular, it should be understood that the cable 70, once securely within the enclosure 10 and sealed from the external environment, may be routed in any manner suitable to a desired end use. For example, some conductors of the cable 70 can be severed from the cable and spliced for routing external to the enclosure 10. In addition, some conductors of the cable 70 can be mounted within the enclosure 10, and a remainder of the conductors can pass through the enclosure without splicing thereof. This ability to selectively separate and utilize conductors of the cable 70 within the enclosure adds to the reliability of the conductors, since only those needed for a particular application need be withdrawn from their casing.

Figure 5:
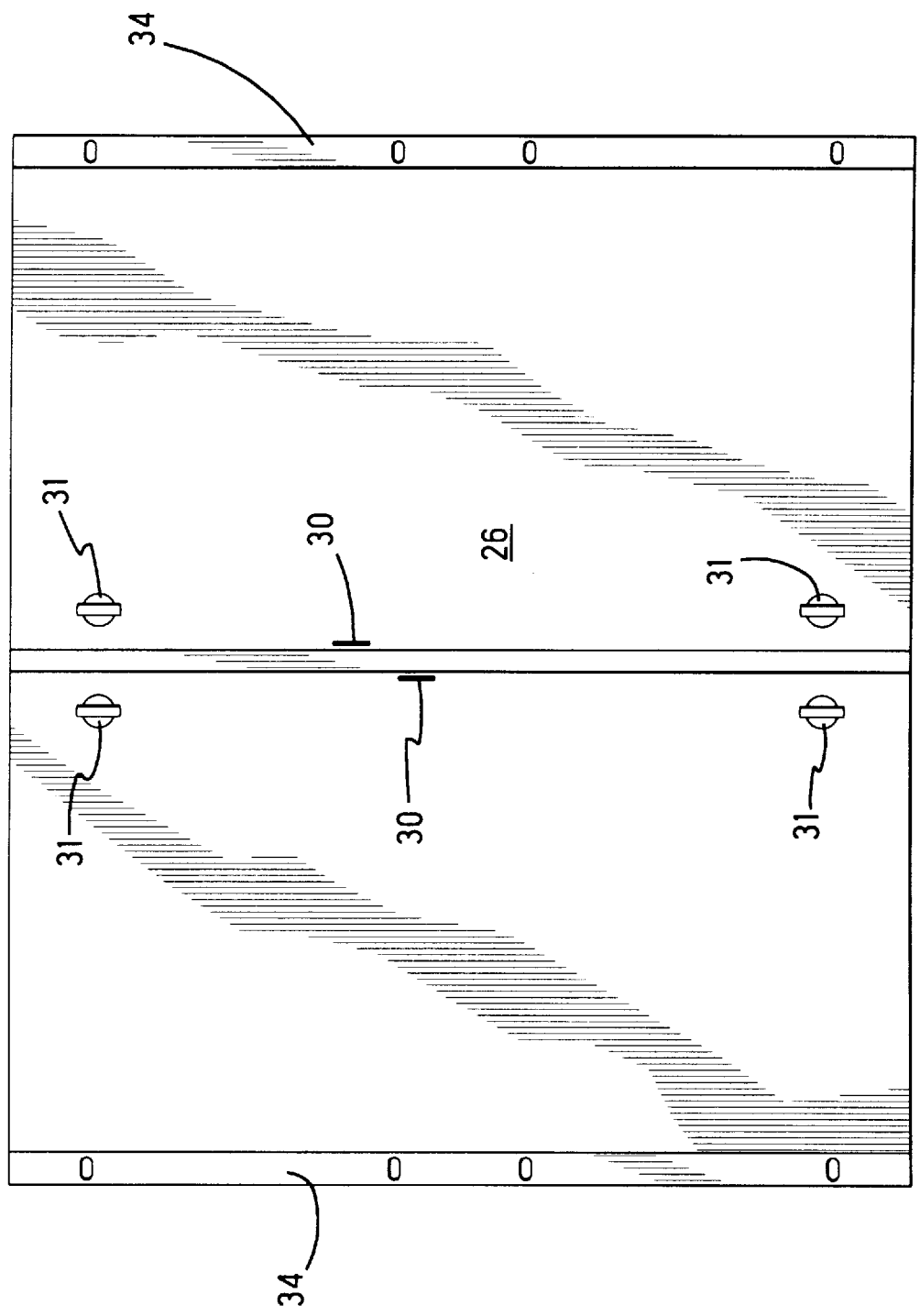
FIG. 5 is a front plan exterior view of a closed enclosure.

The enclosure 10 is closed at the front thereof by means of doors including a left door 24 and a right door 26 as shown in FIG. 5. Each of the doors 24, 26 is mounted to the enclosure 10 with hinges 28. Although two hinges 28 are shown for each door 24, 26, any number of hinges may be used which will support the doors for their intended use. In order to secure the doors from the outside of the enclosure, door latches 30 are provided. The door latches 30 normally slip over hasps 32 for a padlock or the like. The hasps 32 are mounted to the frame of the enclosure in a location to correspond to the door latches 30. Since each side of the enclosure is used by a different party, it will be understood that separate latching of the doors 24, 26 is usually necessary and therefore requires the use of separate doors, hinges and locking mechanisms. An additional simple locking knob 31 is shown which may be used independently of or in addition to the door latches 30. It will be appreciated that various locking mechanisms may be used according to the end use of the enclosure and the user's preferences. In addition, it should be considered within the scope of an embodiment of the invention to only provide one door to the enclosure 10 in the event that a single user of the enclosure will occur. The doors 24, 26 include a gasket material 27 between the door and the enclosure 10 to assist in the complete sealing of the enclosure from the external environment.

In order to seal the entirety of the enclosure 10 from weather, insects and other intrusions, it is necessary to seal the slots 22 formed in the floor 20 of the enclosure 10.

Sealing of the enclosure 10 includes the following as shown in an exploded view within FIG. 2. Each of the slots 22 is sealed such that only a cable 70 or cluster of cables will be allowed to pass through as shown in FIG. 4. A plurality of threaded bolts 50 are inserted through the floor 20 of the enclosure 10 or welded upright to an inner floor surface of the enclosure. A single one of the plurality of bolts 50 is positioned in proximity to a respective one of the corners of each slot 22. Each of the threaded bolts 50 extends perpendicularly to the floor and toward an interior of the enclosure 10.

The first portion of the sealing assembly includes a single base plate 52 for each slot 22. The base plate 52 has apertures 54 formed adjacent one end of the plate. The base plate 52 is of a length to cover about two thirds of the slot 22. When the plate 52 is positioned over the slot 22, the base plate forms a cover to a portion of the slot. The base plate 52 is positioned by inserting the threaded bolts 50 through respective apertures 54 formed in the base plate. Edges of the base plate 52 then physically seat on the floor 20 of the enclosure 10.

A sealant material 58 is positioned over the base plate 52. The sealant material 58 is a type of gasket, for example a Sealant #25 gasket material, made by AMP Incorporated. Regardless of the selection of sealant material, the sealant material 58 must be resilient enough to be easily molded around cable 70 extending into and out of the enclosure 10 through the opening remaining after placement of the plate 52 as shown. It is expected that the sealant material 58 will in fact mold around cable 70 entering and exiting the enclosure 10 and will indefinitely retain its malleable characteristic in order to maintain the necessary seal.

Further, a pair of clamping plates 60 is positioned over the sealant material 58. The clamping plates 60 are formed as plate pairs, and are identical in a surface peripheral shape to the base plate 52. The clamping plates 60 include apertures 62 formed in each plate adjacent opposite ends thereof, and a cutout portion formed in facing side edges of each of the pair of plates 60. The clamping plates 60 include a three-sided depending skirt portion 68. The depending skirt portion 68 depends from the edges of the plate free of a cutout portion 64.

The mating of the pair of clamping plates 60 results in a single circular opening being formed through which cable 70 will pass. Alignment of the clamping plates 60 occurs naturally by inserting the threaded bolts 50 through the apertures 62 of the plates 60. In an embodiment of the invention, the clamping plates 60 are shown to substantially surround the sealant material 58 when applied against the base plate 52.

A physical clamping of the clamping plates 60 against the sealant 58 and hence base plate 52 is by a member such as a threaded wing nut 66 over each of the threaded bolts 50, and securing the wing nut 66 to a tightness necessary to effectuate a desired seal. It has been described that the bolt 50 is threaded and that the wing nut 66 is also threaded to engage with the threaded bolt 50. However, it should be understood that any suitable nut and bolt arrangement is included within the scope of an embodiment of the invention. In particular, the nut and bolt must tighten to the extent that they effect the intended securing of the clamping plates 60 against the sealant 58 and base plate 52 and further mold the sealant 58 completely around the cable 70.

Referring now to FIGS. 3 and 4 there are shown additional views of the enclosure 10. First, FIG. 3 provides an exposed end and partially sectional view of the enclosure 10 in a closed condition. In other words, when the enclosure 10 is closed, the cables 70 are run into and out of the enclosure 10 through the openings within the seal assembly. Next, FIG. 4 is a front plan view with the doors of the enclosure open, showing the entry point of the cable 70 through the floor. Although only the entry point for one side of the enclosure 10 is shown, the cable will exit out of the remaining pass-through in the enclosure floor 20 on the same side of the enclosure 10. The openings defined by a completed seal assembly on the remaining side of the enclosure 10 are for a similar use.

The invention having been described, it is clear that certain modifications and variations of the cable enclosure with pass-through can be made without departing from the spirit and scope of the invention. These modifications may include application of various materials for the enclosure, and is intended to include variations in size and shape of the recited components to the extent that they are still able to house various cables and seal the housing against an external environment. Examples of materials given above are suitable for application to a enclosure housing fiber optic cables and related components thereof.

To this end, use of other materials as well as their subassemblies is considered within the purview of the ordinary skilled artisan. These obvious modifications and variations are within the theme and spirit of the invention and are considered within the scope of the following claims.

We claim:

1. A sealed enclosure for a cable comprising:
    a floor surface, said floor surface having a discontinuous periphery defining at least one opening in the floor surface, said at least one opening defining a pass through in said floor surface;
    side and back walls upstanding from said floor surface;
    a ceiling surface joined with said side and back walls and opposite said floor surface;
    at least one door mounted to a front of said enclosure against corresponding edges of said floor surface, said side walls, and said ceiling surface; and
    a sealing assembly positioned over said at least one opening in said floor surface.

2. The enclosure according to claim 1, wherein said sealing assembly includes:
    a base plate of a predetermined outer perimeter and of a length less than a length of said at least one opening in said floor surface;
    a malleable sealing material positioned over said base plate;
    a pair of clamping plates of a predetermined outer perimeter, each of said clamping plates having a planar surface with a cutout portion formed at an edge thereof, and a skirt portion depending from edges of the planar surface which are free of the cutout portion; and
    clamping members for securing said clamping plates against said base plate, and compressing said sealing material therebetween;
    wherein said cutouts of said clamping plates are aligned and positioned over at least a portion of said at least one opening in said floor surface beyond an end of said base plate, and wherein the combined closing of said at least one door and installation of said sealing assembly seals said enclosure from an external environment.

3. The enclosure according to claim 2, wherein solid clamping members include at least two bolts extending internally of said enclosure from said floor surface and adjacent said pass through, apertures formed in said base plate and each of said clamping plates, and a securing member engageable with each one of said at least two bolts, wherein a single one of said at least two bolts penetrates said base plate and said clamping plates thereby aligning the apertures.

4. The enclosure according to claim 3, wherein said bolts are threaded and said securing member is a threaded nut.

5. The enclosure according to claim 2, wherein the cutout portion of said clamping plates is a semicircular cutout.

6. The enclosure according to claim 2, wherein said base plate is of the same perimeter size as said pair of clamping plates.

7. The enclosure according to claim 2, wherein edges of said base plate rest on the floor surface of said enclosure.

8. The enclosure according to claim 2, wherein said malleable sealing material is nonconductive.

9. The enclosure according to claim 1, wherein said pass through is defined by two of said openings.

10. The enclosure according to claim 1, wherein said floor surface opening is a U-shaped opening.

11. The enclosure according to claim 1, wherein said cable is a fiber optic cable.

12. The enclosure according to claim 1, said at least one opening is two openings, wherein said cable fed into said enclosure through one of said openings and out of said enclosure through another of said openings.

13. The enclosure according to claim 1, further comprising a divider wall positioned intermediate one of said side walls and extending from said floor surface to said ceiling and from said back wall to a front edge of said enclosure.

14. The enclosure according to claim 13, wherein said divider wall includes at least one access opening formed therein, said at least one access opening enabling communication of one side of said divider wall with the enclosure on a remaining side of said divider wall.

15. The enclosure according to claim 14, wherein said at least one door mounted to a front of said enclosure includes a pair of doors, with one door for each side of said enclosure as defined by said divider wall.

16. The enclosure according to claim 1, wherein said at least one door includes a locking mechanism for locking said at least one door of said enclosure.

17. The enclosure according to claim 14, wherein at least a portion of said cable is threaded through said at least one access opening in said divider wall.

18. The enclosure according to claim 1, further comprising a splice tray bracket mounted to at least one of said side walls.

19. The enclosure according to claim 1, further comprising at least one cable management bracket mounted to an inner face of said back wall.

20. The enclosure according to claim 1, further comprising a plurality of pegs fixed to an inner face of said back wall for supporting an internal cable thereon.

21. A sealed enclosure for a cable comprising:
a floor surface, said floor surface having a discontinuous periphery defining at least one opening in the floor surface, said at least one opening defining a pass through in said floor surface;
side and back walls upstanding from said floor surface;
a ceiling surface joined with said side and back walls and opposite said floor surface;
at least one door mounted to a front of said enclosure against corresponding edges of said floor surface, said side walls, and said ceiling surface;
a dividing wall positioned intermediate said side walls and extending from said floor surface to said ceiling surface and from said back wall to said at least one door; and
a sealing assembly positioned over said at least one opening in said floor surface, said sealing assembly including
a base plate of a predetermined outer perimeter, said base plate being of a length less than a length of said pass through,
a malleable sealing material positioned over said base plate,
a pair of clamping plates of a predetermined outer perimeter, each of said clamping plates having a planar surface opposite a cutout portion formed at an edge thereof, and a skirt portion depending from edges of the planar surface which are free of said cutout portion, and
clamping members for securing said clamping plates against said base plate, and compressing said sealing material therebetween; wherein said cutout portions of said clamping plates are aligned and positioned over at least a portion of said at least one opening in said floor surface, and wherein the combined closing of said at least one door and installation of said sealing assembly seals said enclosure from an external environment.

22. The enclosure according to claim 21, wherein said clamping members include at least two bolts extending internally of said enclosure from said floor surface and adjacent said pass throughs, apertures formed in said base plate and each of said clamping plates, and a securing member engageable with each one of said at least two bolts, wherein a single one of said at least two bolts penetrates said base plate and said clamping plates thereby aligning the apertures.

23. The enclosure according to claim 21, wherein edges of said base plate rest on a floor of said enclosure.

24. The enclosure according to claim 21, wherein the cutout portion of said clamping plates is a semicircular cutout.

25. The enclosure according to claim 21, wherein said base plate is of the same perimeter size as said pair of clamping plates.

26. The enclosure according to claim 21, wherein said malleable sealing material is nonconductive.

27. The enclosure according to claim 21, wherein two floor surface openings are provided.

28. The enclosure according to claim 21, wherein said at least one opening is a U-shaped opening.

29. The enclosure according to claim 21, wherein said cable is a fiber optic cable.

30. The enclosure according to claim 21, said at least one opening is two openings, wherein said cable is fed into said enclosure through one of said openings and out of said enclosure through another of said openings on each side of said divider wall.

31. The enclosure according to claim 21, wherein said dividing wall includes at least one access opening formed therein, said at least one access opening enabling communication of one side of said dividing wall with the enclosure on a remaining side of said dividing wall.

32. The enclosure according to claim 31, wherein said at least one door mounted to a front of said enclosure includes a pair of doors, with one of said doors for each side of said enclosure as defined by said dividing wall.

33. The enclosure according to claim 21, further comprising mounting members on said enclosure for mounting said enclosure to a separate structure.

34. The enclosure according to claim 21, further comprising mounting brackets fixed to an inner face of said back wall.

35. The enclosure according to claim 21, further comprising a splice tray bracket mounted to at least one of said side walls.

36. The enclosure according to claim 21, further comprising at least one cable management bracket mounted to an inner face of said back wall.

37. The enclosure according to claim 21, further comprising a plurality of pegs fixed to an inner face of said back wall for supporting internal cable thereon.

38. A sealing assembly comprising:
a base plate of a predetermined outer perimeter positioned over an opening;
a malleable sealing material positioned over said base plate;
a pair of clamping plates of a predetermined outer perimeter being positioned over the opening, each of said clamping plates having a planar surface and a cutout portion formed at adjacent edges thereof, and a skirt portion depending from the planar surface on edges thereof which are free of the cutout portion; and
clamping member for securing said clamping plates against said base plate, and compressing said sealing material therebetween,
wherein said base plate and said clamping plates are aligned.

39. The assembly according to claim 38, wherein said clamping members include at least two bolts mounted adjacent said floor opening, apertures formed in said base plate and said clamping plates, and a securing member engageable with each one of said at least two bolts, wherein a single one of said at least two bolts penetrates said base plate and a single one of said clamping plates thereby aligning the apertures of the same.

40. The assembly according to claim 39, wherein said malleable sealing material is nonconductive.

41. The assembly according to claim 38, wherein the cutout portion of said clamping plates is a semicircular cutout.

42. The assembly according to claim 38, wherein said base plate is of the same perimeter size as said clamping plates.

* * * * *